United States Patent [19]
Jin et al.

[11] Patent Number: 5,450,372
[45] Date of Patent: Sep. 12, 1995

[54] MAGNETORESISTIVE MICROPHONE AND ACOUSTIC SENSING DEVICES

[75] Inventors: Sungho Jin, Millington, N.J.; Larry A. Marcus, Fishers, Ind.; Mark T. McCormack, Summit, N.J.

[73] Assignee: AT&T Corp., Murray Hill, N.J.

[21] Appl. No.: 220,318

[22] Filed: Mar. 30, 1994

[51] Int. Cl.⁶ .................................. H04R 23/00
[52] U.S. Cl. .............................. 367/140; 367/174; 381/168; 381/179; 181/148
[58] Field of Search ............... 367/140, 174, 168; 381/168, 179, 190; 181/148

[56] References Cited

U.S. PATENT DOCUMENTS

| | | | |
|---|---|---|---|
| 4,602,513 | 7/1986 | Hirota et al. | 73/725 |
| 4,722,229 | 2/1988 | Hirota et al. | 73/725 |
| 4,745,812 | 5/1988 | Amazeen et al. | 73/777 |

*Primary Examiner*—J. Woodrow Eldred
*Attorney, Agent, or Firm*—Glen E. Books

[57] ABSTRACT

In accordance with the invention, a new type of microphone utilizes a magnetoresistive sensing element. Specifically, acoustical energy causes vibrations between a magnetoresistive element and a magnet, producing a variation in the resistance which can be used to convert an acoustical signal into a corresponding electrical signal.

10 Claims, 2 Drawing Sheets

MAGNETORESISTIVE MICROPHONE AND ACOUSTIC SENSING DEVICES

FIELD OF THE INVENTION

This invention relates to acoustic sensing devices such as microphones and, in particular, to an acoustic sensing device employing a sensing element of magnetoresistive material.

BACKGROUND OF THE INVENTION

Microphones are used in a myriad of modern electrical devices and consumer products such as telephones, CB radios, broadcasting equipment, sound recorders and camcorders. A microphone is basically a transducer that converts sound into an electrical signal, with a capability to respond quantitatively to rapid changes in acoustical energy over a range of frequencies. There are various types of microphone designs based on different transduction mechanisms: e.g. the carbon microphone, the piezo-electric microphone, the moving-coil microphone, and condenser (or electret) microphone. See M. Clifford, *Microphones—how they work and how to use them*, Ch. 2, Tab Books, Blue Ridge Summit, Pa., 1977. Among conventional microphones, the electret microphone is the most widely used mainly because of its low cost. Unfortunately the performance and reliability of the electret microphone leaves much to be desired. Accordingly, there is a need for simple, low cost microphone of improved performance and reliability.

SUMMARY OF THE INVENTION

In accordance with the invention, a new type of microphone utilizes a magnetoresistive sensing element. Specifically, acoustical energy causes vibrations between a magnetoresistive element and a magnet, producing a variation in the resistance which can be used to convert an acoustical signal into a corresponding electrical signal.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for graphical illustrations, are not to scale.

DETAILED DESCRIPTION

A brief description of magnetoresistance and magnetoresistive materials is useful in understanding the invention. The "magnetoresistance" (MR) of a material is the resistance R(H) of the material in an applied field H less the resistance $R_o$ in the absence of the applied field, i.e., $MR = R(H) - R_o$. The resistance difference MR is typically normalized by dividing by R(H) and expressed as a MR ratio in percent:

MR ratio $= (R(H) - R_o)/R(H)$

Conventional materials (e.g. permalloy) typically have a positive MR ratio of a few percent. Recently, relatively large values of MR ratio were observed in metallic multilayer structures, e.g. Fe/Cr or Cu/Co. See, for instance, P. M. Levy, *Science*, Vol. 256, p. 972 (1992), E. F. Fullerton, *Applied Physics Letters*, Vol. 63, p. 1699 (1993), and T. L. Hylton, *Science*, Vol. 265, p. 1021 (1993). More recently still, much higher MR ratios were observed by applicant Jin and co-workers in thin oxide films of lanthanum-manganites. See, for example, the co-pending U.S. patent applications by S. Jin et al: Ser. No. 08/154,766 filed on Nov. 18, 1993 entitled "Article Comprising Magnetoresistive Material"; Ser. No. 08/176366 filed on Dec. 30, 1993 entitled "Magnetoresistive Current Sensor Having High Sensitivity"; and Ser. No. 08/187,668 filed on Jan. 26, 1994 entitled "Article Comprising Improved Magnetoresistive Material". These three applications are incorporated herein by reference. The manganite films exhibit advantageous characteristics of very large magnetoresistance in combination with higher electrical resistivity than metallic MR materials so that the output voltage signal $\Delta V$ is large.

Figure 1:
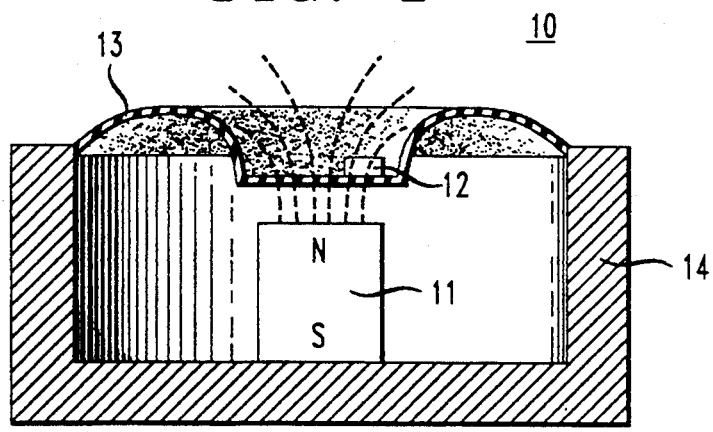
FIG. 1 is a schematic diagram illustrating a first embodiment of an acoustic sensing device employing a sensing element of magnetoresistive material.

Turning now to the use of such materials in an acoustic sensing device, FIG. 1 schematically illustrates acoustic sensing device 10 comprising a magnet 11 for generating a graded magnetic field, a magnetoresistive sensing element 12, and a diaphragm 13 responsive to acoustic energy for moving element 12 within the graded field. The magnet 11 and diaphragm 13 are conveniently mounted on a frame 14.

The magnet 11 can be a permanent magnet or an electromagnet whose field decreases with distance away from the magnet. Preferably it is a permanent magnet of Nd-Fe-B, Sm-Co or hexaferrite. Conveniently, it is a Nd-Fe-B 0.5 in. diameter magnet producing a bias field of about 500 Oe at 1 mm from the magnet.

Diaphragm 13 preferably comprises a thin plastic membrane. The basic function of the diaphragm is to hold element 12 in spaced relation to magnet 11 in the absence of acoustic energy and to vibrate in response to acoustic energy, thereby varying the distance between element 12 and magnet 11.

Magnetoresistive element 12 preferably comprises a thin film of magnetoresistive material, and preferably the element is mounted on diaphragm 13 as by epoxy adhesive. A suitable magnetoresistive material is $La_{0.5}Ca_{0.25}Sr_{0.08}MnO_x$ which can be disposed as a 1000 Å film on a $LaAlO_3$ substrate (1 mm × 2 mm × 4 mm). The film is advantageously heat-treated in an oxygen ambient (3 hours at 950° C. in 3 atm of $O_2$).

Figure 2:
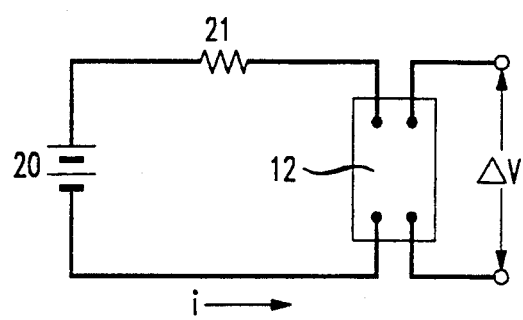
FIG. 2 is a diagram showing a typical circuit configuration for use with the device of FIG. 1.

Electrically, element 12 is preferably serially disposed in a constant current i, and an output voltage is taken across element 12. An exemplary circuit is shown in FIG. 2. Power source 20 combined with resistor 21 in series with element 12 drive a constant current i through element 12. The output voltage V is taken across element 12. The power source 20 can be a 13 volt battery, resistor 21 can be a 2 K$\Omega$ resistor and sensor 12 typically has a resistance $R_o = 3.86$ K$\Omega$. The circuit supplies a constant current i=2.2 mA through element 12.

In operation, as sound waves with varying intensity hit diaphragm 13, the diaphragm vibrates, moving element 12 in relation to magnet 11 in the graded field and thereby changing the magnetic field to which element 12 is exposed. The resulting change in the resistivity of element 12 changes the output voltage $\Delta V$.

Figure 3:
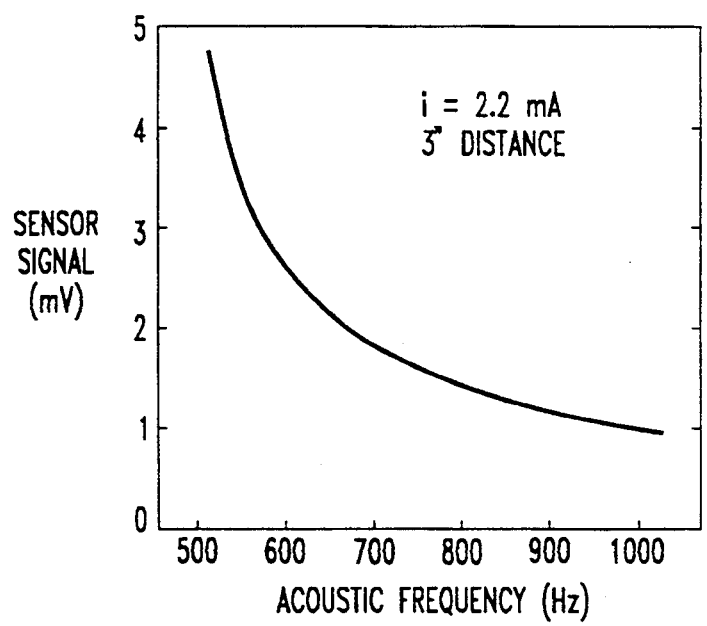
FIG. 3 is a graphical display of peak-to-peak output voltage as a function of acoustic frequency for the device of FIG. 1.

The resulting voltage signal $\Delta V$ has the same frequency as the impinging acoustic wave. FIG. 3 shows the frequency dependency of the measured $\Delta V$ signal (peak-to-peak value in the pseudo-sinusoidal perturbation in voltage) induced by the acoustic wave. The sinusoidal acoustic wave was generated by using a frequency generator in combination with a speaker. The acoustic wave intensity was maintained at 100 dB (when measured at a distance of 3" above the MR sensor). A constant input current of 2.2 mA was supplied. The voltage output $\Delta V$ exhibited the same frequency as that for the acoustic wave. Thus the frequency detection is easily achieved. While some dependency of the output voltage on frequency is observed, the unamplified voltage signal in FIG. 3 under a relatively small input current of 2.2 mA is substantial, over 1 mV, adequate for most microphone applications. Higher output voltage, if needed, can be obtained i) by increasing the input current, ii) by increasing the magnetic field gradient, iii) by increasing the vibration amplitude of the diaphragm (e.g. using diaphragm material with different elastic moduli), or iv) by choosing a MR material with higher MR ratio or higher electrical resistivity.

Figure 4:
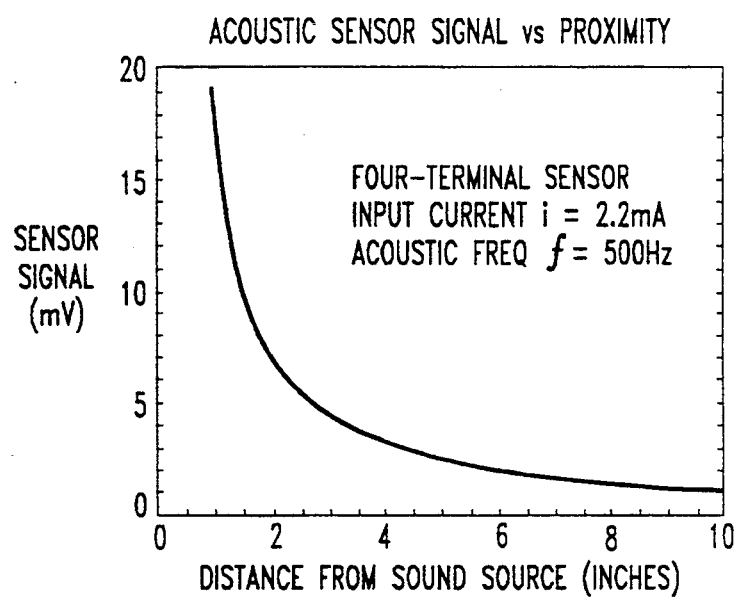
FIG. 4 is a graphical display of the output voltage signal vs proximity to the sound source for the device of FIG. 1.

The device is able to pick up sound at a distance. FIG. 4 shows the voltage output as a function of the distance between the sensing element 12 and the source of a sound wave. The frequency of the acoustic wave was kept at 500 Hz. As is desired for microphone device, the signal from element 12 was dependent on the distance from the sound source and hence on the intensity of the sound. Substantial voltage output even without any amplification is obtained over a distance of several inches, which is the typical upper limit distance for most microphone applications.

Figure 5:
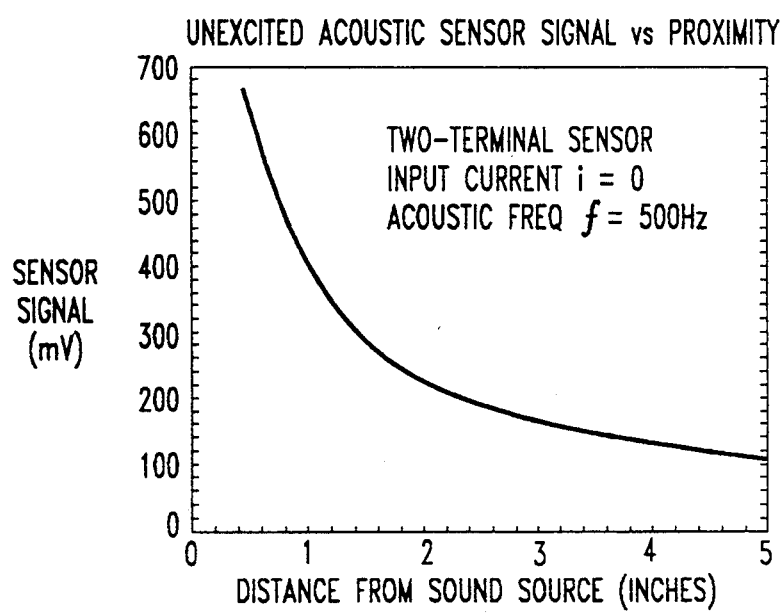
FIG. 5 is a display of the output voltage signal vs proximity to the sound source for a device similar to that of FIG. 1 without a current source.

The sensing element 12 in the inventive device does not require four terminals as in FIGS. 1 and 2. A simple two-terminal device (for output voltages only) can also be used. In this case, no input current is used and there is no power consumption. Shown in FIG. 5 is the output voltage $\Delta V$ in the two-terminal configuration vs the distance from a sound source. All the experimental conditions were the same as for FIG. 4 except that there was no input current. While the output signal is somewhat lower than for the four-terminal configuration, the signal is still substantial, ~100 $\mu$V at 5" distance. This mode is advantageous in applications where the simplicity of the design and the removal of the power supply for the sensing element is desired. These modifications can reduce device costs.

Figure 6:
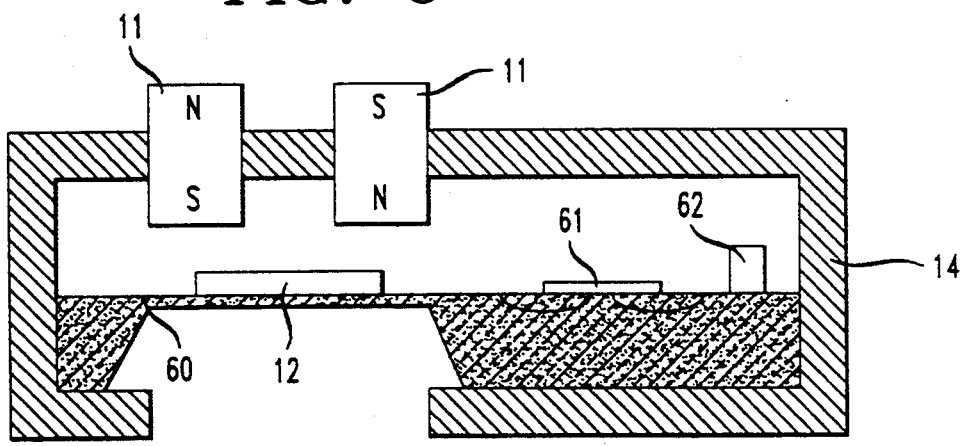
FIG. 6 is a second embodiment of an acoustic sensing device using a magnetoresistive sensing element.

There are various other embodiments of magnetoresistive microphones. For example, FIG. 6 shows an alternative embodiment of microphone design. Here, a silicon substrate 60 is locally machined or thinned into a membrane configuration (as exaggerated in FIG. 6) so that the silicon serves as a diaphragm responding to acoustic pressure. Desired circuits, such as an amplifier 61 and a telecommunications transmission circuit 62 can be integrated onto the silicon, and the sensing element 12 can be mounted or deposited directly on the silicon in electrical contact with the circuits where needed.

In principle, any magnetoresistive material can be used for the inventive device, but high MR ratio and adequate resistivity are generally preferred. In preferred embodiments, the magnetoresistive film can be made from compounds of the form $A_w B_x C_y O_z$ where A is chosen from one or more rare earth elements (La, Y, Ce, Nd, Sin, En, Tb, Dy, Ho, Er, Tin, Yb, and Lu), B is chosen from one or more elements from (Mg, Ca, Sr, Ba, Pb and Cd) and C is chosen from Cr, Mn, Fe, and Co. Advantageously, $0.4 \leq w \leq 0.9$, $0.1 \leq x \leq 0.6$, $0.7 \leq y \leq 1.5$, and $2.5 \leq z \leq 3.5$. Preferably, $0.5 \leq w \leq 0.8$, $0.15 \leq x \leq 0.5$, $0.8 \leq y \leq 1.2$, and $2.7 \leq z \leq 3.3$. In a preferred compound, A is La, B is Ca, Sr, Ba, Pb or their mixture, and C is Mn.

Fabrication of preferred magnetoresistive material is described in detail in the co-pending U.S. patent application Ser. No. 08/154,766 and Ser. No. 08/187,668, both of which are incorporated herein by reference. A preferred composition layer was made as follows. A 1000 Å thick layer of nominal composition $La_{0.5}Ca_{0.25}Sr_{0.08}MnO_x$ was deposited on a (100) $LaAlO_3$ substrate by pulsed laser ablation using a 12 mm diameter$\times$5 mm thick target of the same composition. The pulsed laser deposition was carried out in a partial oxygen atmosphere of 100 mTorr with the substrate temperature of 650°–700° C. The film was subsequently heat treated at 950° C. for 3 hours in 3 atmosphere oxygen environment. Other insulating substrates such as $SrTiO_3$ and MgO may also be used. It is preferable to have some epitaxy or at least some c-axis texture for higher MR ratio in the film. Other non-lattice matching substrates such as $Al_2O_3$ or Si may also be used, preferably with a suitable buffer layer added for epitaxy or electrical insulation purpose.

The magnetoresistive sensing material can be in the form of epitaxial or non-epitaxial thin films prepared by physical deposition such as laser ablation, sputtering, evaporation, MBE (molecular beam epitaxy) or by chemical deposition such as electroless, electrolytic or chemical vapor deposition or other techniques such as plasma spray or screen printing. Alternatively, thick films or bulk materials can also be used if a sufficiently high signal can be obtained.

While the invention has been described in relation to a preferred magnetoresistive material, more generally the sensing material can be any magnetoresistive material, preferably with high electrical resistivity ($\rho > 0.5$ m$\Omega$·cm and preferably $\rho > 5$ m$\Omega$·cm). Such a high electrical resistivity is advantageous for high sensing voltage output at a low input power.

The inventive magnetoresistive microphone has the following advantages when compared to the conventional microphone transducers such as the electret, moving coil, or other designs: the assembly and construction is simpler as the inventive MR sensor can be made by conventional ceramic manufacturing processing into thick or thin films. In contrast, the electret microphone design requires plating of polymer and charging equipment, and the moving-coil design requires winding of coils. The inventive magnetoresistive microphone generally gives higher voltage output upon acoustic excitation than the electret microphone. The thin, light and compact (small) size of the MR element allows easy mounting on diaphragm or any other substrates if needed. The magnetoresistive element can also be used in conjunction with micromachined or thin diaphragm-shape semiconductor substrates for easier integration with other circuitry.

While the inventive acoustical sensing device is referred to as a microphone, it could be used as a general transducer for converting acoustic signal into electrical signal, for example, hydrophones for underwater applications or noise-level meters.

We claim:

1. An acoustic sensing device comprising:
   a magnet for producing a graded magnetic field;
   a sensing element comprising a body of magnetoresistive material, said magnetoresistive material comprising a compound of the form $A_wB_xC_yO_z$ where A comprises one or more rare earth elements, B comprises one or more elements chosen from the group consisting of Mg, Ca, Sr, Ba, Pb and Cd, and C is one or more elements from the group consisting of Cr, Mn, Fe and Co; and
   a diaphragm responsive to acoustic waves for varying the distance between said sensing element and said magnet.

2. A device according to claim 1 further comprising a circuit for sensing changes in the resistance of said magnetoresistive material.

3. A device according to claim 1 further comprising a circuit for applying current through said body of magnetoresistive material and a circuit for sensing the voltage across said body.

4. The device of claim 1 wherein $0.4 \leq w \leq 0.9$, $0.1 \leq x \leq 0.6$, $0.7 \leq y \leq 1.5$ and $2.5 \leq z \leq 3.5$.

5. The device of claim 1 wherein $0.5 \leq w \leq 0.8$, $0.15 \leq x \leq 0.5$, $0.8 \leq y \leq 1.2$ and $2.7 \leq z \leq 3.3$.

6. The device of claim 1 wherein A is La, B is one or more elements from the group consisting of Ca, Sr, Ba or Pb, and C is Mn.

7. The device of claim 1 wherein said diaphragm comprises a layer of silicon.

8. The device of claim 1 wherein said sensing element comprises a body of magnetoresistive material having electrical resistivity $\rho > 0.5$ m$\Omega$·cm.

9. The device of claim 1 wherein said sensing element comprises a body of magnetoresistive material having electrical resistivity $\rho > 5$ m$\Omega$·cm.

10. A telecommunications transmission device comprising a microphone according to claim 1 or 2 or 3 or 4 or 5 or 6 or 7 or 8 or 9.

* * * * *